E. G. PARKER AND R. STROPPEL.
COMBINATION KNIFE AND FORK.
APPLICATION FILED NOV. 4, 1918.
1,341,153. Patented May 25, 1920.
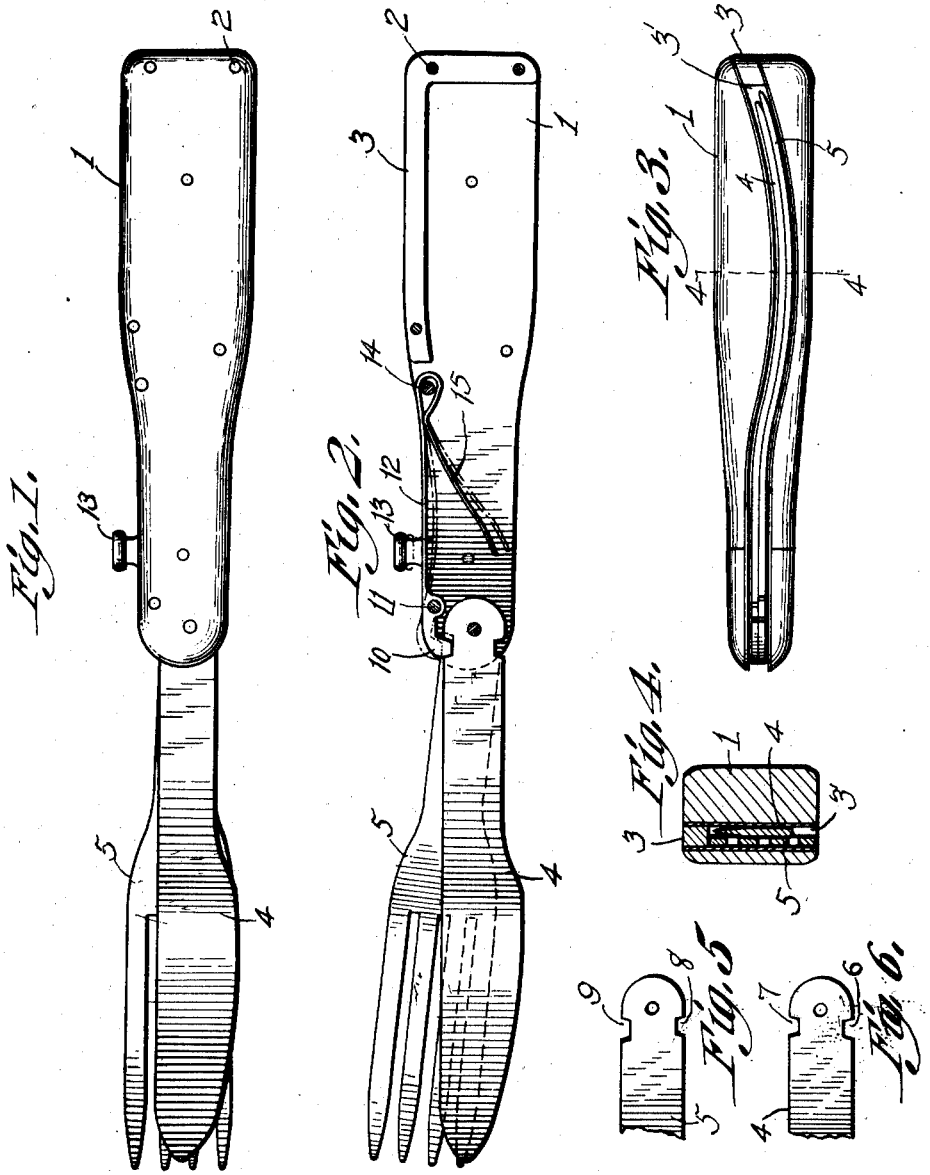

UNITED STATES PATENT OFFICE.

EDWARD GODRIC PARKER AND RUDOLF STROPPEL, OF WEST BRANCH, IOWA.

COMBINATION KNIFE AND FORK.

1,341,153.  Specification of Letters Patent.  Patented May 25, 1920.

Application filed November 4, 1918. Serial No. 261,010.

*To all whom it may concern:*

Be it known that we, EDWARD GODRIC PARKER and RUDOLF STROPPEL, citizens of the United States, residing at West Branch, in the county of Cedar and State of Iowa, have invented certain new and useful Improvements in Combination Knives and Forks, of which the following is a specification.

The subject of this invention is a combination knife and fork.

The main object of the invention is to combine a knife and fork in one article for convenience in transporting, and especially useful to campers and others in like situation, and to persons having the use of but one hand.

Another object of the invention is the provision of means for holding the blades housed in the handle, for removing the blades from their housing, and for holding the blades in their open position.

Another object of the invention is the provision of means for permitting the fork to move out of the way when the knife is being used for cutting.

The invention also contemplates generally improving the construction and enhancing the utility of combination knives and forks.

With the foregoing and such other objects in view, as will appear as the description proceeds, the invention resides in the novel arrangement and combination of parts and in the details of construction hereinafter described and claimed, it being understood that changes in the precise embodiment of the invention herein disclosed can be made within the scope of what is claimed without departing from the spirit of the invention.

A practical structure for carrying out the invention is illustrated in the accompanying drawing, wherein:—

Figure 1 is a view in side elevation of a device constructed in accordance with the invention, the blades shown in open position;

Fig. 2 is a similar view, the near side of the handle cut away;

Fig. 3 is a view in elevation of the device showing the blades folded into the handle;

Fig. 4 is a cross section taken on the line 4—4 of Fig. 3;

Fig. 5 is a fragmentary detail in elevation of the pivotal end of the fork;

Fig. 6 is a similar view of the knife.

Referring to the drawing by numerals of reference:—

In carrying out the invention there is provided a handle 1, composed of two side pieces which are joined by the rivet pins 2 or the like, and which are held in spaced relation by the spacing piece 3 to provide a curved groove 3', which extends longitudinally of the handle and opens at one face thereof. This groove serves as a space in which the blades of the instrument are housed or nested.

Pivotally secured in one end of the handle are a knife blade 4 and a fork 5, which are arranged side by side in position to be folded into the handle for housing. The pivotal end of the knife blade 4 has a notch 6 formed in one edge thereof, and in the opposite edge a similar notch 7. The pivotal end of the fork has a similar notch 8 formed in one edge thereof, and a longer notch 9 formed in the opposite edge. The notch 9 is made longer than the notch 7 of the knife blade so that the fork may give, as indicated in Fig. 2, when the knife is being used for cutting.

A pawl 10 is pivotally mounted on a pin 11 between the sides of the handle 1 of the device, and is adapted to enter the notches 6 and 8 for the purpose of retaining the knife and fork in their housed positions, and the notches 7 and 9 for the purpose of holding them in extended or open position.

The pawl 10 is formed with an elongated leaf spring 12 extending therefrom longitudinally of the back of the handle 1, for a short distance, and a push button 13 is secured in any suitable manner upon this spring. At a place between its ends the spring is looped about a pin 14, which extends transversely between the sides of the handle 1 in which it is secured. The free end of this spring projects within the groove 3', as seen most clearly in Fig. 2.

The operation is as follows:—To close the blades, the push button is pressed with the thumb, flexing the spring to the position shown in dotted lines in Fig. 2, which lifts the pawl 10 from the notches 7 and 9 and frees the blades for pivotal movement. The blades are then swung into the groove 3' and the pawl 10 catches in the notches 6 and 8 and holds the blades securely housed in the handle.

When the blades are to be opened, the button 13 is again pushed to flex the spring and release the pawl 10 from the notches 6 and 8 and free the blades to pivotal movement. When the spring is flexed, the free end 15 is moved, as indicated in dotted lines in Fig. 2, and this movement will, as soon as the pawl is released from the notches, expel the blades from the groove 3' to a sufficient extent to allow them to be used for the purpose intended.

Having described the invention, what is claimed as new and sought by Letters Patent is:—

A combination knife and fork, including a handle having a groove, blades pivotally secured to one end of the handle, a pawl pivotally secured to the handle, the blades having notches to be engaged by the pawl when the blades are in open position, one of said notches being of greater extent than the other, whereby one blade may swing past the other when in open position and the blades having other notches to be engaged by the pawl when the blades are closed to hold the blades in housed position within the groove.

In testimony whereof we hereunto affix our signatures.

EDWARD GODRIC PARKER.
RUDOLF STROPPEL.